Figure 1:
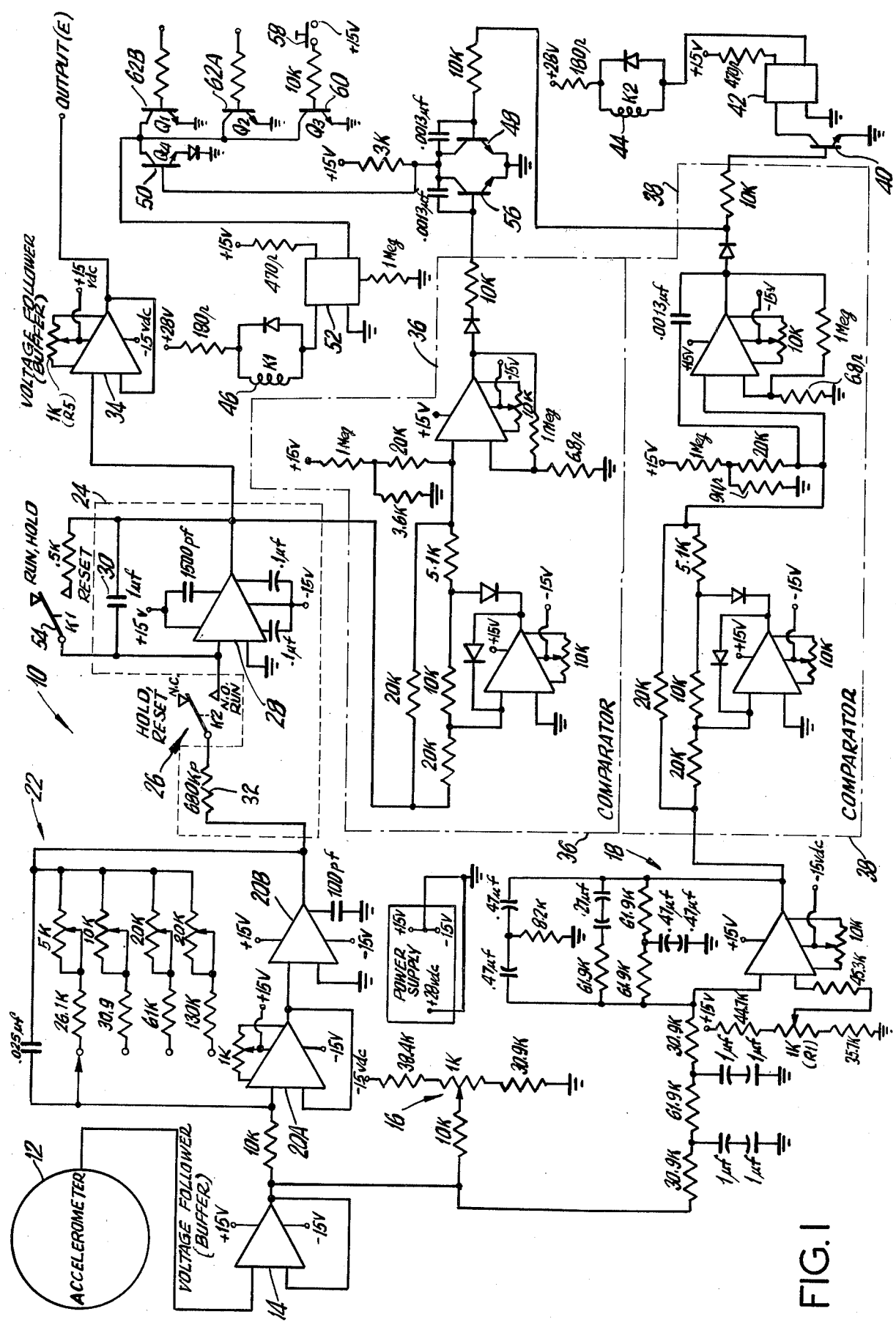

United States Patent [19]

Gravina et al.

[11] 4,085,363
[45] Apr. 18, 1978

[54] RATE MEASURING SYSTEM

[75] Inventors: Anthony N. Gravina, Deer Park; Kenneth D. Lev, Commack; Arthur H. Angst, Northport, all of N.Y.

[73] Assignee: Grumman Aerospace Corporation, Bethpage, N.Y.

[21] Appl. No.: 694,184

[22] Filed: Jun. 9, 1976

[51] Int. Cl.² ............................................. G21B 3/42
[52] U.S. Cl. .................................. 324/162; 328/127; 73/503; 364/565
[58] Field of Search .................. 324/162, 163; 356/28; 73/503; 328/127; 235/151.32; 340/262, 263

[56] References Cited

U.S. PATENT DOCUMENTS

| | | | |
|---|---|---|---|
| 3,012,180 | 12/1961 | Finvold | 73/503 X |
| 3,064,144 | 11/1962 | Hardy | 328/127 X |
| 3,176,518 | 4/1965 | Morris et al. | 73/503 |
| 3,419,784 | 12/1968 | Winn | 328/127 X |
| 3,484,593 | 12/1969 | Schmoock et al. | 328/127 X |
| 3,702,394 | 11/1972 | Rainsberger et al. | 235/151.32 |
| 3,878,375 | 4/1975 | Mickowski | 235/151.32 |

Primary Examiner—Rudolph V. Rolinec
Assistant Examiner—Vincent J. Sunderdick
Attorney, Agent, or Firm—Morgan, Finnegan, Pine, Foley & Lee

[57] ABSTRACT

A rate measuring system for providing velocity signals, as desired, and displacement signals, including at least one accelerometer for providing an output voltage proportional to an acceleration input, amplifying means having an adjustable voltage gain for amplifying the output voltage from the accelerometer, means for integrating the amplifier output voltage to provide an output voltage proportional to velocity, means for comparing the output voltage proportional to the acceleration input and the output voltage proportional to velocity with predetermined voltage reference levels to provide an output signal when these signals are nominally zero, and means for shorting out the integrating means in response to a signal from the comparison means to provide a nominal zero velocity output.

2 Claims, 2 Drawing Figures

RATE MEASURING SYSTEM

The present invention relates to measuring systems, and more specifically to rate measuring systems.

Known measuring systems may generally be grouped into two categories:
1. Gyroscopic measuring systems; and
2. Non-gyroscopic measuring systems.

Gyroscopic measuring systems are generally subject to relatively high failure rates in hostile environments and are relatively expensive. Non-gyroscopic measuring systems are generally limited in range and scope of application.

Known accelerometer derived systems do not offer velocity data and displacement data on a continuous time basis or provide for multi-range operation. U.S. Pat. No. 3,682,003 (Sage et al.) discloses an angular accelerometer including an integrator which functions as an angular rate sensor. U.S. Pat. No. 3,176,518 (Morris et at.) discloses a dual range integrating accelerometer for measuring high thrust and low thrust and an integrator coupled to either of the accelerometers under control of a comparator which senses when missile thrust is within the range of one of the accelerometers. U.S. Pat. No. 3,702,394 (Rainsberger et al.) discloses a device for providing an output signal at a predetermined spatial interval based on the double integration of an input signal from an accelerometer.

It is an object of the present invention to provide a long term integrated, selectable, multi-range, rate measuring system that yields absolute linear or angular velocity data on a continuous time basis by processing acceleration inputs during periods of both accelerated and non-accelerated motion.

Other objects, aspects, and advantages of the present invention will be apparent when the detailed description is considered with the drawings.

Briefly, the rate measuring system of the present invention includes at least one accelerometer for providing an output voltage proportional to its input, amplifying means having an adjustable voltage gain for amplifying the output voltage from the accelerometer, means for integrating the amplified output voltage to provide an output voltage proportional to velocity, means for comparing the input voltage and the intergrated voltage output with predetermined voltage reference levels and providing an output when the input voltage and integrated voltage output are nominally zero, means for shorting out the integrating means in response to an output from said comparator means to provide a nominally zero velocity output, and means for comparing the input voltage and the integrated voltage output to provide a hold on the output voltage when constant rate (zero acceleration) input occurs. Further a second integrating means and comparator means may be utilized to provide output signals proportional to displacement, with the displacement output being zero during nominal zero acceleration, velocity, and displacement. Moreover, where dynamic conditions exist, two accelerometers may be used to obtain an output free from accelerometer sensitivities. These accelerometer sensitivities may be matched and algebraically subtracted to result in masking out undesirable sensitivities that may be processed through the integrating and conditioning electronics. The acceleration observed will then be the pure acceleration free from erroneous accelerometer sensitivities.

Figure 2:
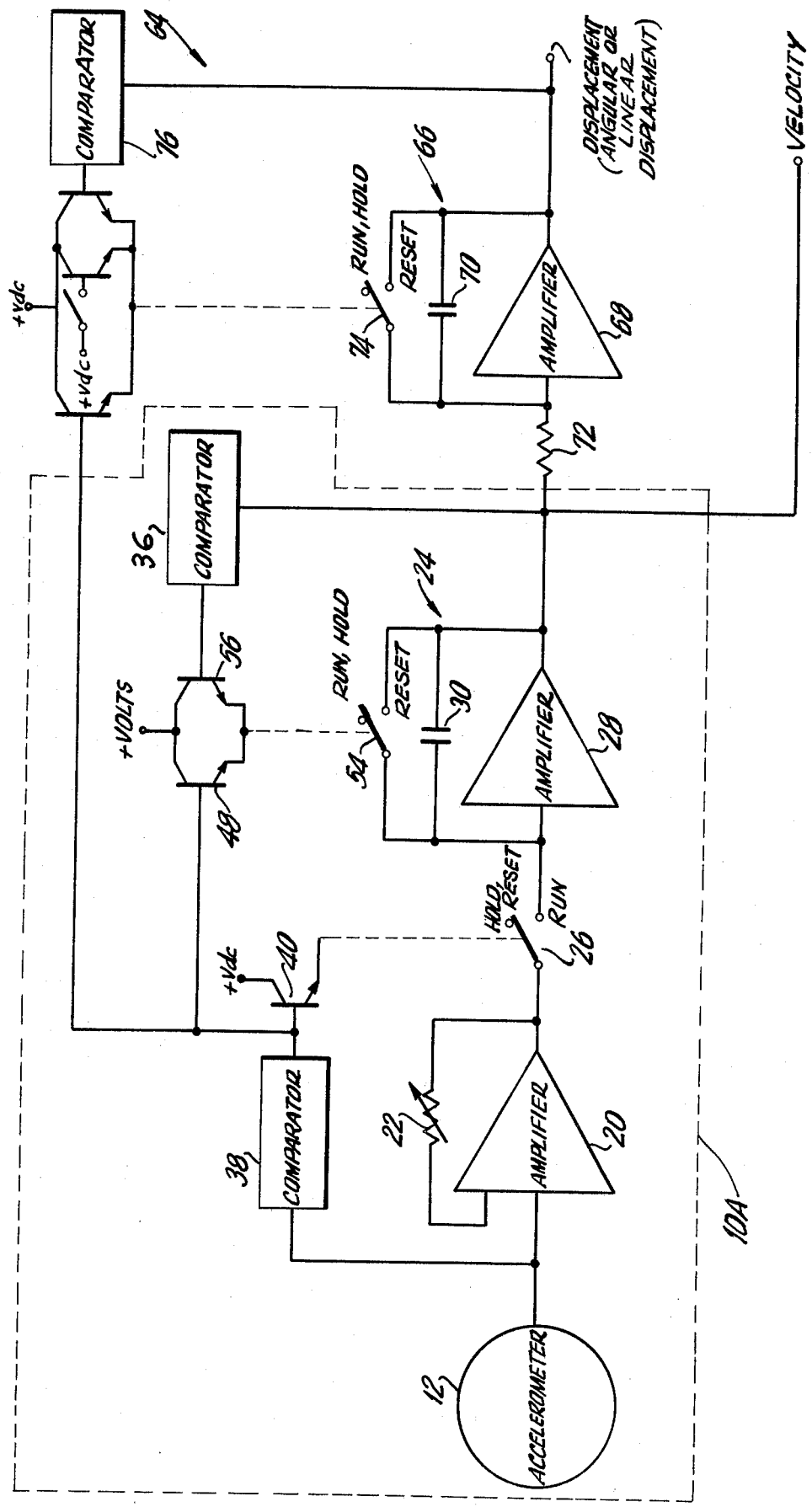

The present invention is illustrated with reference to the accompanying drawings, in which:

FIG. 1 is a schematic diagram of the rate measuring system of the present invention; and FIG. 2 is a block diagram of a rate and displacement measuring system of the present invention.

Referring to FIG. 1, the rate measuring system is generally indicated at 10. The measuring system includes an accelerometer 12, which provides an output voltage proportional to its input (acceleration). An operational amplifier 14 is electrically coupled to the output of the accelerometer 12. The operational amplifier 14 functions as a unity gain non-inverting general purpose buffer. The operational amplifier 14 is electrically coupled to a voltage offset source 16, a filter circuit 18, and operational amplifiers 20A and 20B having a feedback loop. The gain of the amplifiers 20A and 20B is adjusted by switching the desired resistor from a parallel source of feedback resistors 22 into the feedback loop. Selection of various feedback resistors 22 provides full scale outputs for decreased acceleration inputs. This technique of changing the scale provides full scale multi-range operation over the entire range of the accelerometer capability, i.e., from full accelerometer capability to accelerometer threshhold capability.

The output of operational amplifiers 20A and, 20B is electrically coupled to an integrator 24 through a switch 26. The integrator 24 includes an operational amplifier 28, a capacitor 30 and a resistor 32. The integrator 24 provides an output voltage proportional to velocity which may be further amplified by a unity gain buffer operational amplifier 34 or another operational amplifier, as desired. The output of the integrator 24 is also electrically coupled to a first comparator drive circuit 36. A second comparator drive circuit 38 is electrically coupled to the filter circuit 18 and controls the opening and closing of the switch 26 thereby determining what information is to be integrated by integrator 24. The second comparator drive circuit 38 is preset with a predetermined reference plus or minus voltage level (nominally zero) to provide an output voltage when the accelerometer output exceeds this preset predetermined plus or minus voltage level. When the second comparator 38 provides an output voltage it drives a transistor 40, an electrically coupled optical isolator 42, and an electrically coupled relay 44 to a "Run" condition. When relay 44 is in the "Run" condition, the signal from the accelerometer 12 is amplified by the feedback resistors 22 and integrated when another relay 46 is open. The comparator drive circuit 38 also drives a transistor 48, a transistor 50, an optical isolator 52, and the relay 46. Therefore, when the preset predetermined reference voltage levels about nominal zero of the comparator driver circuit 38 are exceeded, relay 44 closes to a "Run" condition (switch 26 closes) and relay 46 opens to a "Run" condition (switch 54 opens), and velocity data is present at the output of the integrator 24.

The comparator drive circuit 36 is also preset to a predetermined reference plus or minus voltage level (nominal zero) and also drives a transistor 56, the transistor 50, the optical isolator 52, and the relay 46 as conditions warrant. Therefore, as velocity data is present beyond the preset predetermined voltage level of comparator drive circuit 36, relay 46 remains in a "RUN" or "HOLD" condition.

During zero acceleration, nominal zero voltage input from accelerometer 12, and constant velocity, voltage level beyond comparator 36, the comparator 38 stops driving relay 44 and opens switch 26 to a "HOLD" condition and drives relay 46 to a "HOLD" condition, thereby maintaining constant velocity output during zero acceleration input.

During a decrease in velocity and/or decreasing acceleration, the comparator 38 drives relay 44 and maintains relay 46 in the "RUN" condition. Relay 46 is still being held in a "RUN" or "HOLD" condition by comparator drive circuit 36. When the decreasing acceleration (voltage) and decreasing velocity (voltage) fall within the preset predetermined voltage levels of comparator drive circuits 38 and 36, relays 44 and 46 are driven to the "RESET" condition. The complete cycle of "RUN," "HOLD" and "RESET" may again be repeated in either a positive or negative direction, as desired.

A push button switch 58 is electrically coupled to a transistor 60 and to the optical isolator 52 and relay 46 to enable initiation of a manual "RESET" (zero output), if desired. Transistors 52 may also be electrically connected to some preprogrammed switching network to allow for an automatic "RESET" condition.

Referring to FIG. 2, a measuring system 64 is illustrated in which the measuring system 10 of FIG. 1 forms a part thereof. With the measuring system 64, displacement data as well as rate or velocity data is obtained. In addition to the components similarly numbered from FIG. 1, the measuring system 64 includes another integrator 66, whose input is electrically coupled to the output of the integrator 24. The integator 66 includes circuitry similar to integrator 24, i.e., an operational amplifier 68, a feedback capacitor 70, and a resistor 72. A relay switch 74 is connected in parallel with the capacitor 70. The output of the integrator 66 is coupled to a comparator 76, and if desired, a buffer operational amplifier (not shown). The output of comparator 76 is electrically coupled to the relay switch 74 in a similar manner as comparator drive circuits 38 and 36 are coupled to relay switches 26 and 54. The comparator drive circuits 36, 38 and 76 are preset to a predetermined plus or minus voltage level, as discussed with reference to FIG. 1. Therefore, when the comparator drive circuits 36, 38, and 76 have coincident signals, relay switches 26, 54 and 74 are driven to the "RESET" position. When the input signal (increasing acceleration) from the accelerometer 12 exceeds the preset voltage level of comparator drive circuit 36, relays 26, 54 and 74 are driven into the "RUN" position. During nominal zero acceleration and constant velocity, within the preset voltage limits of comparator drive circuits 36, 38 and 76, the relays 26, 54 and 74 are driven to the "HOLD" in the same manner as described with reference to FIG. 1. During a decrease in velocity and decrease in acceleration, the preset voltage level of the comparator drive circuit 38, relay 26 is driven to the "RUN" position and relays 54 and 74 are held in the "RUN" or "HOLD" position. When decreased acceleration and velocity are within the present voltage limits of the comparators 38 and 36, relays 26 and 54 return to the "RESET" position and relay 74 is maintained in its "HOLD" position until manually reset. Manual resetting returns all the relays to a "RESET" position.

It should be understood by those skilled in the art, that various modifications may be made in the present invention without departing from the spirit and scope thereof, as described in the specification and defined in the appended claims.

What is claimed is:

1. A rate measuring system, comprising:
(a) at least one accelerometer for providing an output voltage proportional to an acceleration input;
(b) amplifying means connected to the output of said accelerometer for amplifying said voltage proportional to acceleration, said amplifying means having an adjustable voltage gain for changing the scale of the output voltage from said accelerometer to provide full scale, multi-range operation over the entire range of acceleration inputs;
(c) an integrator;
(d) first comparator means connected to the output of said accelerometer for producing an output when the voltage from a accelerometer exceeds said predetermined value;
(e) first switch means responsive to the output from said first comparator means for connecting the output of said amplifying means to the input of said integrator when said accelerometer voltage exceeds said predetermined value;
(f) second comparator means connected to the output of said integrator for producing an output when the voltage from said integrator exceeds a predetermined value; and
(g) second switch means connected across said integrator and responsive to the outputs from said first and second comparator means for bypassing said integrator to provide a nominal zero velocity output signal when the inputs to said first and second comparator means are below predetermined values.

2. A rate measuring system comprising:
(a) at least one accelerometer for providing an output voltage proportional to an acceleration input;
(b) amplifying means connected to the output of said accelerometer for amplifying said voltage proportional to acceleration, said amplifying means having an adjustable voltage gain for changing the scale of the output voltage from said accelerometer to provide full scale multi-range operation over the entire range of acceleration inputs;
(c) a first integrator;
(d) first comparator means connected to the output of said accelerometer for producing an output when the voltage from said accelerometer exceeds a predetermined value;
(e) first switch means responsive to the output from said first comparator means for connecting the output of said amplifying means to the input of said first integrator when said accelerometer voltage exceeds said predetermined value;
(f) second comparator means connected to the output of said first integrator for producing an output when the voltage from said first integrator exceeds a predetermined value;
(g) second switch means connected across said first integrator and responsive to the outputs from said first and second comparator means for bypassing said first integrator to provide a nominal zero velocity output signal when the inputs to said first and second comparator means are below predetermined values;
(h) a second integrator connected to the output of the first integrator;
(i) third comparator means connected to the output of said second integrator for producing an output when the voltage from said second integrator exceeds a predetermined value; and
(j) third switch means connected across said third integrator and responsive to the outputs from said first and third comparators for bypassing said second integrator to produce a nominal zero displacement output signal when the inputs to said first and third comparators are below predetermined values.

* * * * *